United States Patent
Sugimoto

(10) Patent No.: US 9,454,614 B2
(45) Date of Patent: *Sep. 27, 2016

(54) SEARCH INFORMATION PROVIDING APPARATUS AND SEARCH INFORMATION PROVIDING METHOD

(71) Applicant: YAHOO JAPAN CORPORATION, Tokyo (JP)

(72) Inventor: Akira Sugimoto, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/789,354

(22) Filed: Jul. 1, 2015

(65) Prior Publication Data

US 2015/0302102 A1    Oct. 22, 2015

Related U.S. Application Data

(63) Continuation of application No. 13/737,438, filed on Jan. 9, 2013, now Pat. No. 9,104,722.

(30) Foreign Application Priority Data

Apr. 18, 2012  (JP) ................................ 2012-095156

(51) Int. Cl.
   *G06F 17/30*      (2006.01)
   *G06Q 30/02*      (2012.01)

(52) U.S. Cl.
   CPC ... *G06F 17/30867* (2013.01); *G06F 17/30424* (2013.01); *G06F 17/30554* (2013.01); *G06Q 30/0254* (2013.01); *G06Q 30/0277* (2013.01)

(58) Field of Classification Search
   CPC ................. G06F 17/30867; G06F 17/30424; G06Q 30/0277
   See application file for complete search history.

(56) References Cited

U.S. PATENT DOCUMENTS

| 7,844,591 B1 | 11/2010 | Lettau et al. |
| 8,411,112 B1 | 4/2013 | Ainslie et al. |
| 2007/0208880 A1 | 9/2007 | Lauper et al. |

(Continued)

FOREIGN PATENT DOCUMENTS

| JP | H08-234956 A | 9/1996 |
| JP | 2006-030244 A | 2/2006 |

(Continued)

OTHER PUBLICATIONS

Oct. 7, 2014 Office Action issued in Japanese Patent Application No. 2013-267451.

(Continued)

*Primary Examiner* — Grace Park
(74) *Attorney, Agent, or Firm* — Oliff PLC

(57) ABSTRACT

An information searching apparatus according to an embodiment includes a receiving unit that receives a search request including a search keyword; an acquiring unit that acquires information corresponding to a specific search keyword from an information storage unit when the search keyword included in the search request is the specific search keyword; a generating unit that generates a search result page for displaying a search result and a background image based on the information acquired by the acquiring unit; and a transmitting unit that transmits the search result page generated by the generating unit to a request source.

11 Claims, 8 Drawing Sheets

(56) References Cited

U.S. PATENT DOCUMENTS

| | | |
|---|---|---|
| 2009/0030900 A1 | 1/2009 | Iwasaki |
| 2009/0287566 A1 | 11/2009 | McAfee |
| 2009/0319373 A1 | 12/2009 | Barrett |
| 2011/0314419 A1 | 12/2011 | Dunn et al. |

FOREIGN PATENT DOCUMENTS

| | | |
|---|---|---|
| JP | 2010-160642 A | 7/2010 |
| JP | 2010-211258 A | 9/2010 |
| JP | 2010-211777 A | 9/2010 |
| JP | 2011-221133 A | 11/2011 |

OTHER PUBLICATIONS

Aug. 20, 2013 Office Action issued in Japanese Patent Application No. 2012-095156.

Mar. 1, 2016 Office Action issued in Japanese Patent Application No. 2015-019013.

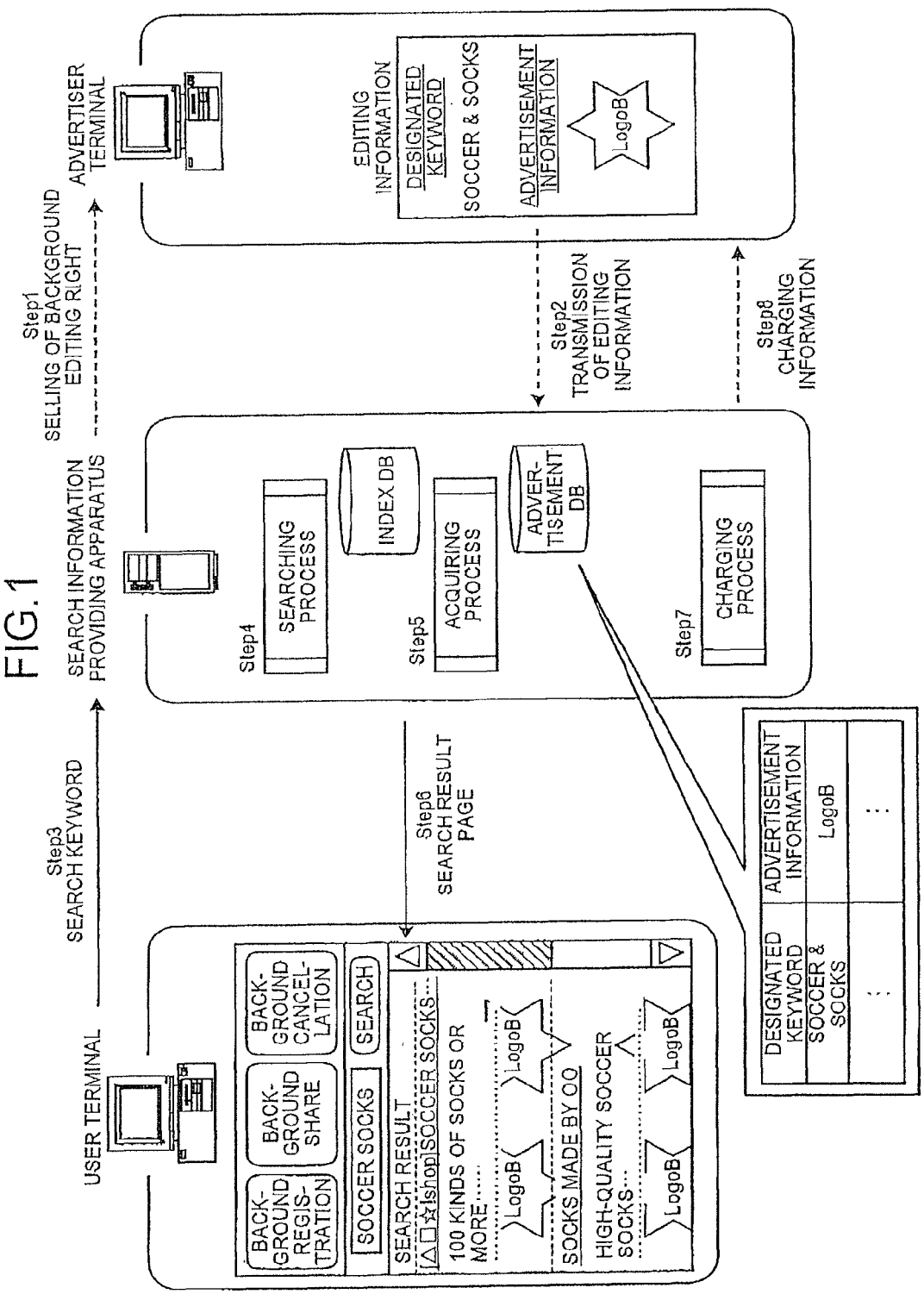

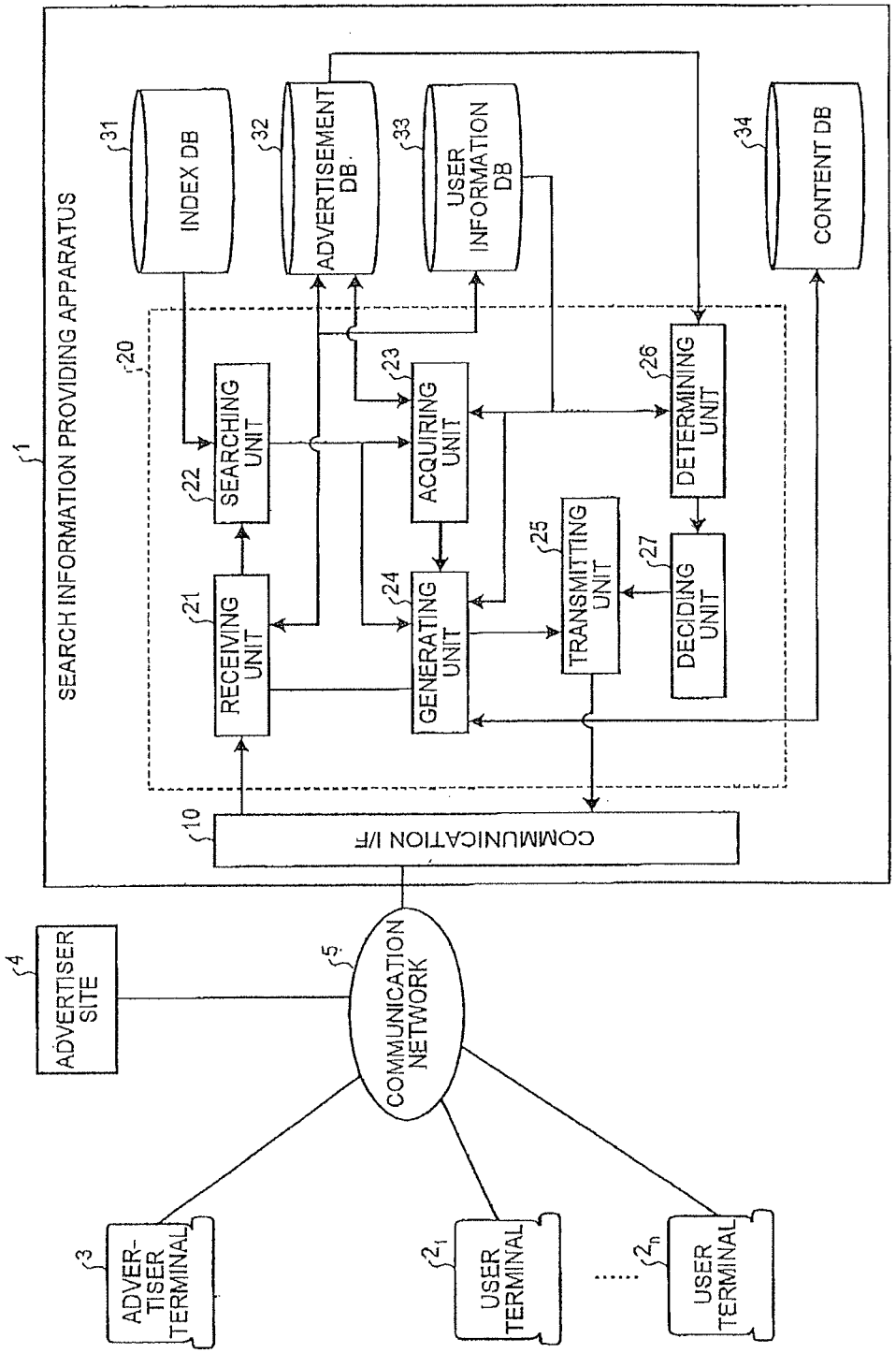

FIG.3

ADVERTISEMENT INFORMATION TABLE

| ADVERTISEMENT ID | DESIGNATED KEYWORD | CATEGORY | ADVERTISEMENT CLASSIFICATION | STORAGE POSITION | ADVERTISER ADDRESS | NUMBER OF SEARCHES | NUMBER OF DISPLAYS | NUMBER OF REGISTRATIONS | NUMBER OF SHARES | DISPLAY UPPER LIMIT NUMBER | DISPLAY POSITION |
|---|---|---|---|---|---|---|---|---|---|---|---|
| 10001 | SOCCER & SOCKS | CLOTH | 1 | /dat/1a | http://sz·· | 2031 | 2851 | 29 | 1 | — | 2 |
| | | | 2 | /dat/1b | http://sz·· | 3287 | 3876 | 39 | 6 | — | 1 |
| 10002 | LIQUID CRYSTAL TELEVISION | HOME APPLIANCE | 3 | /dat/2a | http://ad·· | 63 | 78 | 1 | 0 | 500 | 3 |
| ⋮ | ⋮ | ⋮ | ⋮ | ⋮ | ⋮ | ⋮ | ⋮ | ⋮ | ⋮ | ⋮ | ⋮ |

FIG.4A      FIG.4B      FIG.4C

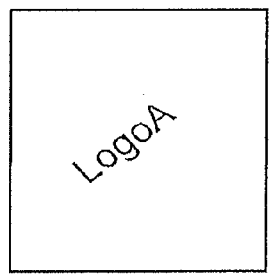
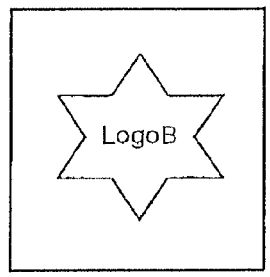
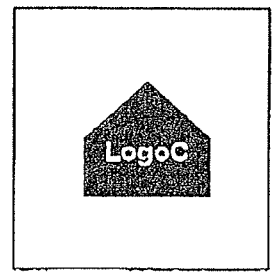

FIG.6

USER INFORMATION TABLE

| USER ID | MEMBER CLASSIFICATION | SEX | AGE | PREFERENCE INFORMATION | LATEST ADVERTISEMENT ID | REGISTRATION ADVERTISEMENT ID | SHARE ADVERTISEMENT ID | NUMBER OF SEARCHES | NUMBER OF DISPLAYS | NUMBER OF REGISTRATIONS | NUMBER OF SHARES |
|---|---|---|---|---|---|---|---|---|---|---|---|
| 20001 | 1 | MALE | 28 | CAR SPORTS | 10002 | 10001 | 0 | 398 | 483 | 1 | 0 |
| 20002 | 2 | FE-MALE | 26 | COOK-ING | 108271 | - | 1 | 63 | 74 | 0 | 1 |
| ⋮ | ⋮ | ⋮ | ⋮ | ⋮ | ⋮ | ⋮ | ⋮ | ⋮ | ⋮ | ⋮ | ⋮ |

SEARCH INFORMATION PROVIDING APPARATUS AND SEARCH INFORMATION PROVIDING METHOD

CROSS-REFERENCE TO RELATED APPLICATIONS

This is a Continuation of application Ser. No. 13/737,438 filed Jan. 9, 2013, which claims priority to Japanese Patent Application No. 2012-095156 filed Apr. 18, 2012. The disclosures of the prior applications are hereby incorporated by reference herein in their entireties.

BACKGROUND OF THE INVENTION

1. Field of the Invention

The present invention relates to a search information providing apparatus and a search information providing method.

2. Description of the Related Art

The vast amount of information is provided on the Internet. Therefore, users use search sites to search for interest information in many cases. Advertisement delivery called search matching advertisement or search interlock advertisement is performed on the search sites.

Such a kind of advertisement delivery is performed by delivering, to users, search result pages in which advertisements associated with keywords designated by users are displayed in contiguity with search results obtained in response to the search keywords. This technique has been known as disclosed in, for example, Japanese Laid-open Patent Publication No. 2010-211777.

However, since search sites are accessed by various kinds of user terminals, advertisements are not necessarily displayed with effect in some cases in the conventional advertisement delivery in which advertisements are displayed by texts or banners in separate areas from the search results.

SUMMARY OF THE INVENTION

According to one aspect of the embodiments, a search information providing apparatus' includes a receiving unit that receives a search request including a search keyword, a searching unit that acquires first information corresponding to the search keyword as a search result based on the search keyword included in the search request, an information storage unit that stores second information corresponding to a specific search keyword, an acquiring unit that acquires the second information corresponding to the specific search keyword from the information storage unit when the search keyword included in the search request is the specific search keyword, a generating unit that generates a search result page for displaying the search result and a background image based on the second information acquired by the acquiring unit, and a transmitting unit that transmits the search result page generated by the generating unit to the source performing the search request including the specific search keyword.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

A more complete appreciation Of the invention and many of the attendant advantages thereof will be readily obtained as the same becomes better understood by reference to the following detailed description when considered in connection with the accompanying drawings, wherein:

FIG. 1 is a diagram illustrating a search information providing process according to a embodiment;

FIG. 2 is a diagram illustrating a configuration example of the search information providing apparatus according to the embodiment;

FIG. 3 is a diagram illustrating an example of an advertisement information table stored in an advertisement DB;

FIGS. 4A to 4C are diagrams illustrating examples of images which are based on advertisement information;

FIG. 6 is a diagram illustrating an example of a user information table stored in user information DB;

DESCRIPTION OF EMBODIMENT

Figure 5A:
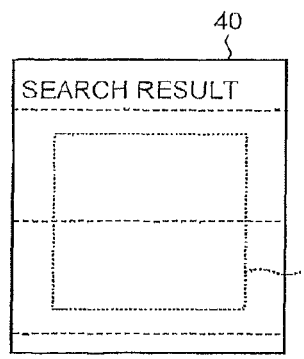
FIGS. 5A to 5C are diagrams illustrating examples of the display positions of an advertisement image.

Hereinafter, a search information providing apparatus and a search information providing method according to an embodiment of the present disclosure will be described in detail with reference to the accompanying drawings. Further, the present disclosure is not limited to the search information providing apparatus and the search information providing method according to the embodiment. Hereinafter, a "database" is also referred to as a "DB."

1. Search Information Providing Process

First, a search information providing process performed by the search information providing apparatus according to an embodiment will be described. FIG. 1 is a diagram illustrating the search information providing process according to the embodiment. The search information providing apparatus, a user terminal, and an advertiser terminal illustrated in FIG. 1 are connected to a communication network such as the Internet, and thus, for example, can communicate with each other via the communication network by access in which addresses or the like are designated.

When a search keyword designated by the user terminal is a specific search keyword, the search information providing apparatus performs the search information providing process of generating a search result page in which an advertisement corresponding to the specific search keyword is set as a background and transmitting the search result page to the user terminal. An advertisement with the background of the search result page is provided from an advertiser who purchases an advertisement posting right. The advertisement posting right is an editing right of a search result page background and is also referred to as a background editing right below.

As illustrated in FIG. 1, an operator (hereinafter, also referred to as a search service provider) of the search information providing apparatus that provides search service sells the background editing right to an advertiser (Step 1). The selling of the background editing right is realized in such a manner that, for example, the search information providing apparatus transmits information regarding the background editing right to the advertiser terminal and the search information providing apparatus receives order information of the background editing right from the advertiser terminal.

An advertiser purchasing the background editing right transmits editing information from the advertiser terminal to the search information providing apparatus (Step 2). The editing information includes information regarding a keyword (hereinafter, referred to as a designated keyword) desired by an advertiser and advertisement information. The search information providing apparatus stores information regarding the designated keyword (corresponding to an example of a specific search keyword) included in the editing information acquired from the advertiser terminal and the advertisement information in association with each other in an advertisement DB.

In the example illustrated in FIG. 1, "soccer & socks" as the designated keyword and information (hereinafter, referred to as LogoB information), which is used to generate an image in which a character, LogoB, is written in a star-shape frame, as the advertisement information are stored in association therewith in the advertisement DB. Note that, in "soccer & socks," "&" indicates an AND condition.

Thus, the information regarding the designated keyword and the advertisement information from each advertiser who purchases the background editing right are acquired and stored in the advertisement DB. After the information regarding the designated keyword and the advertisement information are stored in the advertisement DB, the search information providing apparatus can generate a search result page in which an image based on the advertisement information stored in the advertisement DB is set as a background image based on the designated keyword stored in the advertisement DB.

The search information providing apparatus receives a search request from the user terminal (Step 3). The search information providing apparatus performs a searching process of searching an index DB based on the search keyword included in the search request and acquiring information corresponding to the search keyword from the index DB (Step 4). Here, the search keyword transmitted from the user terminal is "soccer & socks" and is a keyword of the AND condition of "soccer" and "socks." The search information providing apparatus acquires information associated with both "soccer" and "socks" from the index DB.

Further, when the search keyword accords with the designated keyword stored in the advertisement DB, the search information providing apparatus performs an acquiring process of acquiring the advertisement information corresponding to the designated keyword from the advertisement DB (Step 5). The advertisement DB stores "soccer & socks" as the designated keyword that accords with the search keyword. Accordingly, the search information providing apparatus acquires the LogoB information as the advertisement information corresponding to "soccer & socks" from the advertisement DB.

Then, the search information providing apparatus generates a search result page in which a search result obtained through the searching process is displayed using the image which is based on the advertisement information acquired through the acquiring process as background image, and transmits the generated search result page to the user terminal of a search request source (Step 6). The search result page transmitted from the search information providing apparatus is displayed on a display of the user terminal. Here, the search result page is a page that has display contents in which the image which is based on the LogoB information is set as a background in the search result corresponding to "soccer & socks."

Thus, a background region of the search result page can be used as advertisement region by displaying the image which is based on the advertisement information as the background image of the search result page, thereby performing effective advertisement display. Since a search service provider provides a new advertisement method to the advertiser, an advertisement revenue can be increased. Further, since the advertiser can deliver an impact and high favorable advertisement, an advertisement effect can be improved. Furthermore, since a screen of a simple search result is not displayed, but desired information is displayed with a screen design associated with interest information, users can feel novelty and pleasure of a search service.

When the background editing right purchased by the advertiser has a payment condition of actual accomplishment, the search information providing apparatus performs a charging process of calculating charging information corresponding to the actual accomplishment of advertisement delivery (Step 7), and then transmits the calculation result to the advertiser terminal (Step 8). The search information providing apparatus calculates the charging information based on, for example, the number of selections of the advertisement information in response to a search request, the number of displays on the search result page, and the number of favorite registrations or the number of shares to be described below as the actual accomplishment of the advertisement delivery.

Hereinafter, the search information providing apparatus performing the search information providing process according to the embodiment will be described in detail with reference to FIGS. 2 to 12.

2. Configuration of Search Information Providing Apparatus

An example of the configuration of the search information providing apparatus according to the embodiment will be described with reference to FIG. 2. FIG. 2 is a diagram illustrating the example of the configuration of the search information providing apparatus according to the embodiment.

As exemplified in FIG. 2, a search information providing apparatus 1 is connected to the user terminals $2_1$ to $2_n$, an advertiser terminal 3, and an advertiser site 4 via a communication network 5. The search information providing apparatus 1 is managed by the search service provider, and the advertiser terminal 3 and the advertiser site 4 are managed by the advertiser.

The user terminals $2_1$ to $2_n$ each include a browser, and thus acquire and display information regarding a page provided from the search information providing apparatus 1 via the communication network 5. For example, when the communication network 5 is the Internet, the page provided from the search information providing apparatus 1 is a web page which is defined by a markup language such as the HTML (HyperText Markup Language). Note that, when it is not necessary to distinguish the user terminals $2_1$ to $2_n$ from each other, the user terminals $2_1$ to $2_n$ are collectively referred to as the "user terminals 2."

For example, since a plug-in type toolbar is embedded in the browser mounted on each user terminal 2, the user of each user terminal 2 uses a search service provided by the search information providing apparatus 1 using the toolbar. For example, when the user inputs a search keyword appropriate for information which the user desires to search for within an input frame of the search toolbar and selects a search button of the search toolbar, a search request is transmitted from each user terminal 2 to the search information providing apparatus 1. In the example illustrated in FIG. 1, "soccer" and "socks" are input to the input frame of the search toolbar and the search button is disposed on the right side of the input frame. Note that, the browser and the toolbar are programs installed and operated in the user terminal 2 and are executed by a control unit of the user terminal 2.

As illustrated in FIG. 2, the search information providing apparatus 1 includes a communication I/F 10, a control unit 20, an index DB 31, an advertisement DB 32, a user information DB 33, and a content DB 34. The control unit 20 includes a receiving unit 21, a searching unit 22, an acquiring unit 23, a generating unit 24, a transmitting unit 25, a determining unit 26, and a deciding unit 27.

The communication I/F 10 is an interface such as an NIC (Network Interface Card). The receiving unit 21 and the transmitting unit 25 of the control unit 20 receive and transmit various kinds of information from and to the user terminal 2 and the advertiser terminal 3 connected to the communication network 5 via the communication I/F 10.

The DBs 31 to 34 are storage devices such as a RAM (Random Access Memory), a semiconductor memory element such as a flash memory, a hard disk, or an optical disc.

The control unit 20 is realized by an integrated circuit such as an ASIC (Application Specific Integrated Circuit) or an FPGA (Field Programmable Gate Array). Further, the control unit 20 is realized by causing a CPU (Central Processing Unit) or an MPU (Micro Processing Unit) to execute a program stored in an internal storage device (not illustrated) using the RAM as a work area. The control unit 20 realizes or performs the function or operations of information processing to be described below.

3. Advertisement DB 32

Figure 5B:
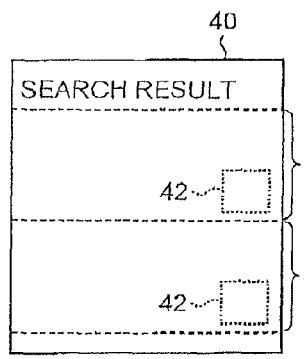
Figure 5C:
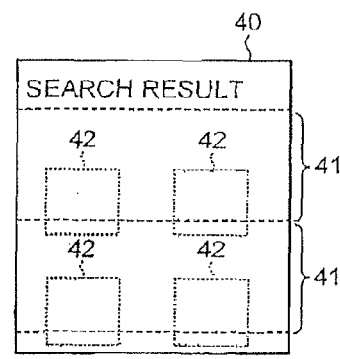

Next, an example of the advertisement DB 32 will be described. The advertisement DB 32 stores an advertisement information table and the advertisement information. FIG. 3 is a diagram illustrating an example of the advertisement information table stored in the advertisement DB 32. FIGS. 4A to 4C are diagrams examples of images which are based on the advertisement information. FIGS. 5A to 5C are diagrams illustrating examples of the display positions of an advertisement image.

As illustrated in FIG. 3, the advertisement information table includes information in which information regarding designated keywords, a category, an advertisement classification, a storage position, an advertiser address, the number of searches, the number of displays, the number of registrations, the number of shares, the display upper limit number, and a display position are associated with each advertisement ID.

The advertisement ID is an ID which the control unit 20 can assign for each background editing right purchased by an advertiser. Further, the designated keyword is a keyword that is included in the editing information acquired from the advertiser terminal 3 and is designated by the advertiser. In the example illustrated in FIG. 3, a designated keyword with an ID of "10001" is "soccer & socks" and a designated keyword with an ID of "10002" is a "liquid crystal television."

The category is a category that corresponds to the designated keyword and is set based on the designated keyword by the control unit 20. For example, a category "cloth" is set for "soccer & socks" and a category "home appliance" is set for the "liquid crystal television." The control unit 20 performs the setting based on, for example, the table in which the designated keyword corresponds to the category.

The advertisement classification is classification information corresponding to the classification of each user terminal 2 and is set into the advertisement information table by the control unit 20 based on the editing information acquired from the advertiser terminal 3. For example, "1" is set as advertisement classification for the user terminal 2 such as a smart phone that includes a relatively small display unit and "2" is set as advertisement classification for the user terminal 2 such as a personal computer that includes a relatively large display unit. Further, "3" is set as advertisement classification irrespective of classification of the user terminal 2. Here, the example in which two kinds of classifications of the user terminal 2 are used has been described. However, the number of classifications of the user terminal 2 is not limited to two, but three or more kinds of classifications may be used depending on the size of a display unit.

The storage position is information that indicates the storage position of the advertisement information corresponding to the designated keyword. The control unit 20 acquires the advertisement information corresponding to the designated keyword in accordance with the storage position from the advertisement DB 32. The advertisement information is information for generating an image serving as a background of a search result page and is, for example, image data (for example, jpeg data or gif data) or data for displaying an image with plug-in embedded in a browser.

The advertisement information may not be data itself for generating an image. For example, the advertisement information may be a URL (Uniform Resource Locator) indicating the storage position of data in the advertiser site 4. Further, the image (hereinafter, also referred to as an advertisement image) which is based on the advertisement information is, for example, images illustrated in FIGS. 4A to 4C, such as characters, signs, graphics, and patterns. When an image is displayed by the plug-in, the image may be an image (for example, an animation image) in which a character, a sign, a graphic, a pattern, or the like is configured dynamically.

The advertiser address is the address of a web page (hereinafter, referred to as an advertiser page) provided by the advertiser site 4. A different address is set for each advertisement classification. The advertiser address is information included in the editing information acquired from the advertiser terminal 3 and is set in the advertisement information table by the control unit 20. Note that, the same address can be also used irrespective of the advertisement classification.

The number of searches is the number of times the designated keyword accords with the search keyword and the advertisement image corresponding to the designated keyword is set as the background of the search result page. The number of searches is set for each advertisement classification in the advertisement information table by the control unit 20. In the example illustrated in FIG. 3, for example, the number of times the designated keyword "soccer & socks" corresponding to the advertisement ID "10001" accords with the search keyword and an advertisement image in which the advertisement classification is "1" is considered as the background of the search result page is "2031."

The number of displays is the number of times (the number of impressions) an advertisement image is set as the background of the search result page irrespective of whether the designated keyword accords with the search keyword. The number of displays is set for each advertisement classification in the advertisement information table by the control unit 20. In the example illustrated in FIG. 3, for example, the number of times the advertisement image which corresponds to the advertisement ID "10001" and in which the advertisement classification is "1" is set as the background of the search result page is "2851."

The number of registrations is the number of favorite registrations by the user terminal 2 and is set for each advertisement classification in the advertisement information table by the control unit 20. The favorite registration is performed, for example, by pressing down and selecting a "favorite registration button" displayed on a search toolbar of the browser displayed on the user terminal 2.

The number of shares is a number shared between friends by the user terminal 2 and is set for advertisement classification in the advertisement information table by the control unit 20. The sharing between the friends is performed, for example, by pressing down and selecting a "share button" displayed on the search toolbar of the browser displayed on the user terminal 2.

The display upper limit number is the upper limit of the number of displays regulated by the background editing right purchased by the advertiser. The display upper limit number is set for each advertisement classification in the advertisement information table by the control unit 20 based on the editing information acquired from the advertiser terminal 3.

In the example illustrated in FIG. 3, for example, the display upper limit number corresponding to the advertisement ID "10002" is "500." When the number of displays corresponding to the advertisement ID "10002" is "500," the control unit 20 ends the process for the background editing right regulated by the advertisement ID "10002." Note that, the display upper limit number may be not the number of displays but the number of searches.

On the other hand, the background editing right of the advertisement ID "10001" is a success reward type background editing right and the display upper limit number corresponding to the advertisement ID "10001" is not set. In the success reward type background editing right, a payment amount of advertiser is determined based on, for example, the number of searches, the number of displays, the number of registrations, the number of shares, or the like.

The display position is information regarding the display position of the advertisement image on the screen of the user terminal 2 and is set based on the editing information acquired from the advertiser terminal 3 by the control unit 20. The information regarding on the display position includes coordinate information and information regarding a display size on the search result page.

For example, when the coordinate information and the display size are set on the entirety of a search result page 40 to display an advertisement image 42, as illustrated in FIG. 5A, "1" is set as the display position. When the search result page 40 is long vertically, an advertisement image 42 is repeatedly displayed vertically in spite of the fact that "1" is set as the display position.

Further, when the coordinate information and the display size are set to display each advertisement image 42 in the right lower portion of the display frame 41 displayed in information of each search result, as illustrated in FIG. 5B, "2" is set as the display position. Furthermore, when the coordinate information and the display size are set to arrange and display the same advertisement image 42 over the display frames 41, as illustrated in FIG. 5C, "3" is set as the display position.

4. User Information DB 33

Next, an example of the user information DB 33 will be described. A user information table is stored in the user information DB 33. FIG. 6 is a diagram illustrating an example of the user information table stored in the user information DB 33.

As illustrated in FIG. 6, the user information table is information in which a member classification, a sex, an age, preference information, a latest advertisement ID, a registration advertisement ID, a share advertisement ID, the number of searches, the number of displays, the number of registrations, and the number of shares are associated with each for each user ID.

The user ID is an ID that is allocated to each user of the user terminal 2. For example, when user registration from the user terminal 2 to the search information providing apparatus 1 is performed, the user ID is set into the user information table by the control unit 20. The member classification indicates a classification of a service provided from the search information providing apparatus 1 and is set in response to a request from the user terminal 2.

The search information providing apparatus 1 according to the embodiment is configured to provide, for example, various kinds of digital contents such as music, movies, magazines, and books to the user terminal 2. The user of each user terminal 2 can acquire desired digital contents by performing the user registration and selecting the member classification. Here, the user of the member classification "1" is a free member and the user of the member classification "2" is paid member. The number and kinds of digital contents browsed by the user of the member classification "2" are abundant.

The sex, the age, the preference information are the sex, the age, the preference information of the user. Note that, the preference information is information regarding the fields preferred by the user. The preference information is determined, for example, with the search keyword which the user uses in the searching in the search information providing apparatus 1 or by the control unit 20 in the digital contents browsed by the user. In the example illustrated in FIG. 6, the fields preferred by the user with the user ID "20001" are "car" and "sports."

The latest advertisement ID is an advertisement ID corresponding to the advertisement image set as the background image of the latest search result page acquired from the search information providing apparatus 1 by the user terminal 2. The latest advertisement ID can be substituted whenever the user acquires the search result page from the search information providing apparatus 1 using the user terminal 2.

For example, it is assumed that a search result page in which an advertisement image corresponding to the advertisement ID "10001" is the background image is acquired with the user terminal 2, and then a search result page in which an advertisement image corresponding to the advertisement ID "10002" is the background image is acquired with the user terminal 2. In this case, the latest advertisement ID is substituted with "10002" from "10001."

The registration advertisement ID is an advertisement ID corresponding to an advertisement image favored and registered by the user. The favorite registration is performed, for example, when the user selects the favorite registration button displayed in the search toolbar of the browser displayed on the user terminal 2. As described above, the search toolbar is the plug-in type toolbar embedded in the browser.

The program of the search toolbar is transmitted from the search information providing apparatus 1 to the user terminal 2 in response to a request of the user terminal 2 and is embedded in the browser of the user terminal 2.

Figure 7:
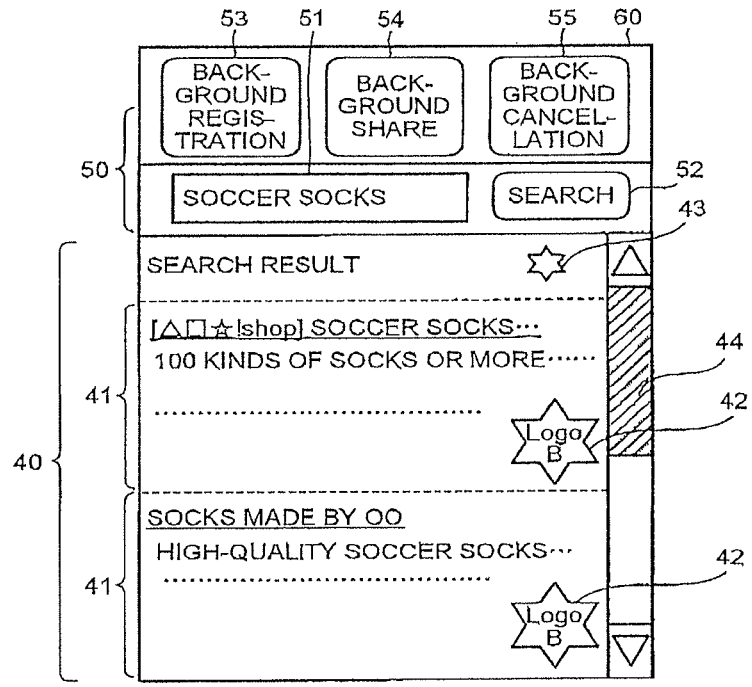
FIG. 7 is a diagram illustrating an example of a screen of a browser displayed on a user terminal.

FIG. 7 is a diagram illustrating an example of a browser screen displayed on the user terminal 2. In the example illustrated in FIG. 7, a scroll bar 44 and a search toolbar 50 are displayed in addition to a page display region on the browser screen 60 of the user terminal 2. The search toolbar 50 includes an input frame 51, a search button 52, a background registration button 53, a background share button 54, and a background cancellation button 55. When the user terminal 2 is a touch panel type terminal, the user selects a button by touching the display region of the touch panel in which a button desired to be selected is displayed.

When the user of the user terminal 2 inputs a desired search keyword to the input frame 51 of the search toolbar 50 and selects the search button 52, a search request is transmitted from the user terminal 2 to the search information providing apparatus 1. In the example illustrated in FIG. 7, the search result page 40 transmitted from the search information providing apparatus 1 in the response to the search request including "soccer & socks" as the search keyword is displayed on the browser screen 60.

When the user selects the background registration button 53 which is the favorite registration button in the state in which the search result page 40 is displayed on the browser screen 60, a background registration request is transmitted from the user terminal 2 to the search information providing apparatus 1. When the control unit 20 of the search information providing apparatus 1 receives the background registration request from the user terminal 2, the control unit 20 sets the latest advertisement ID corresponding to the user ID as the registration advertisement ID based on the user ID corresponding to the user of the user terminal 2.

Referring back to FIG. 6, the description of the user information table will be continued. The share advertisement ID is an advertisement ID shared and registered from the friends. The share registration is performed, for example, when the user selects the share button displayed on the search toolbar displayed on the user terminal 2 and selects a share candidate.

In the example illustrated in FIG. 7, the background share button 54 is a share button used to perform the share registration. When the user selects the background share button 54 in the state in which the search result page 40 is displayed on the browser screen 60, a share registration request is transmitted from the user terminal 2 to the search information providing apparatus 1.

When the control unit 20 of the search information providing apparatus 1 receives the share registration request from the user terminal 2, the control unit 20 acquires user IDs of the friends (hereinafter, referred to as friend IDs) corresponding to the user ID from the user information DB 33 based on the user ID corresponding to the user of the user terminal 2. The control unit 20 of the search information providing apparatus 1 acquires friend names corresponding to the acquired friend IDs from the user information DB 33 and transmits, to the user terminal 2, a share destination selection page in which the friend names are listed as the share candidates.

Figure 8:
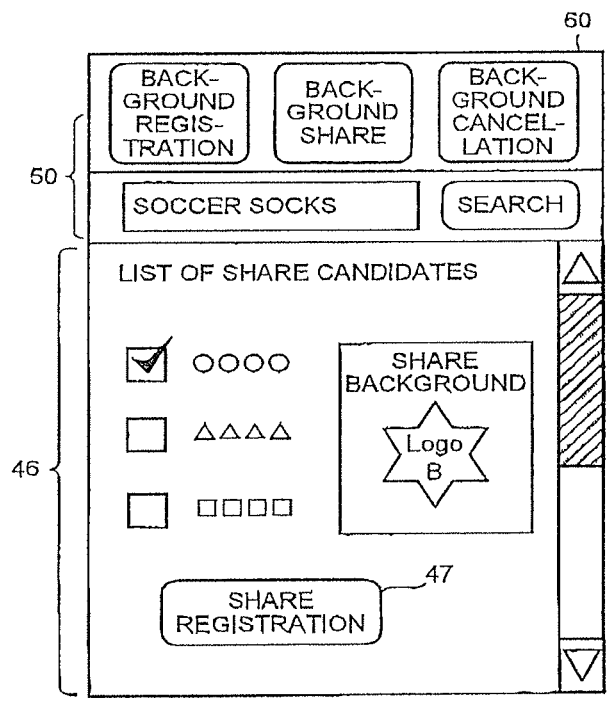
FIG. 8 is a diagram illustrating an example of a share destination selection page displayed on the screen of the browser.

FIG. 8 is a diagram illustrating an example of the share destination selection page displayed on the browser screen 60. In a share destination selection page 46 illustrated in FIG. 8, three friend names, ○○○○, ∆∆∆∆, and □□□□ are displayed as the friend names of the share candidates. When the user of the user terminal 2 selects check boxes formed for the friend names desired to be shared and registered, and ticks off the check boxes and selects a share registration button 47, a share registration confirmation request is transmitted from the user terminal 2 to the search information providing apparatus 1.

When the control unit 20 of the search information providing apparatus 1 receives the share registration confirmation request from the user terminal 2, the control unit 20 sets the share advertisement ID corresponding to the friend ID selected by the user in the user information table. The share registration confirmation request includes, for example, the user ID (hereinafter, referred to as a principal ID) corresponding to the user of the user terminal 2 and the friend ID. The control unit 20 of the search information providing apparatus 1 acquires the latest advertisement ID corresponding to the principal ID from the user information table and updates the user information table such that the latest advertisement ID is set as the share advertisement ID corresponding to the friend ID.

Referring back to FIG. 6, the description of the user information table will be continued. The number of searches is the number of times the search request is performed to the search information providing apparatus 1 from the user terminal 2 of the user. The number of searches is updated by the control unit 20, whenever the user makes the search request. The number of displays is the number of times the search result page is displayed on the user terminal 2 of the user. The number of displays is updated by the control unit 20, whenever the search result page is displayed on the user terminal 2.

The number of registrations is the number of advertisement images favored and registered by the user. In the example illustrated in FIG. 7, the number of registrations is the number of times the user selects the background registration button 53. The number of shares is the number of advertisement images shared and registered. In the example illustrated in FIG. 8, the number of shares is the number of times the user selects the share registration button 47.

5. Operation (Search Information Providing Process)

Figure 9:
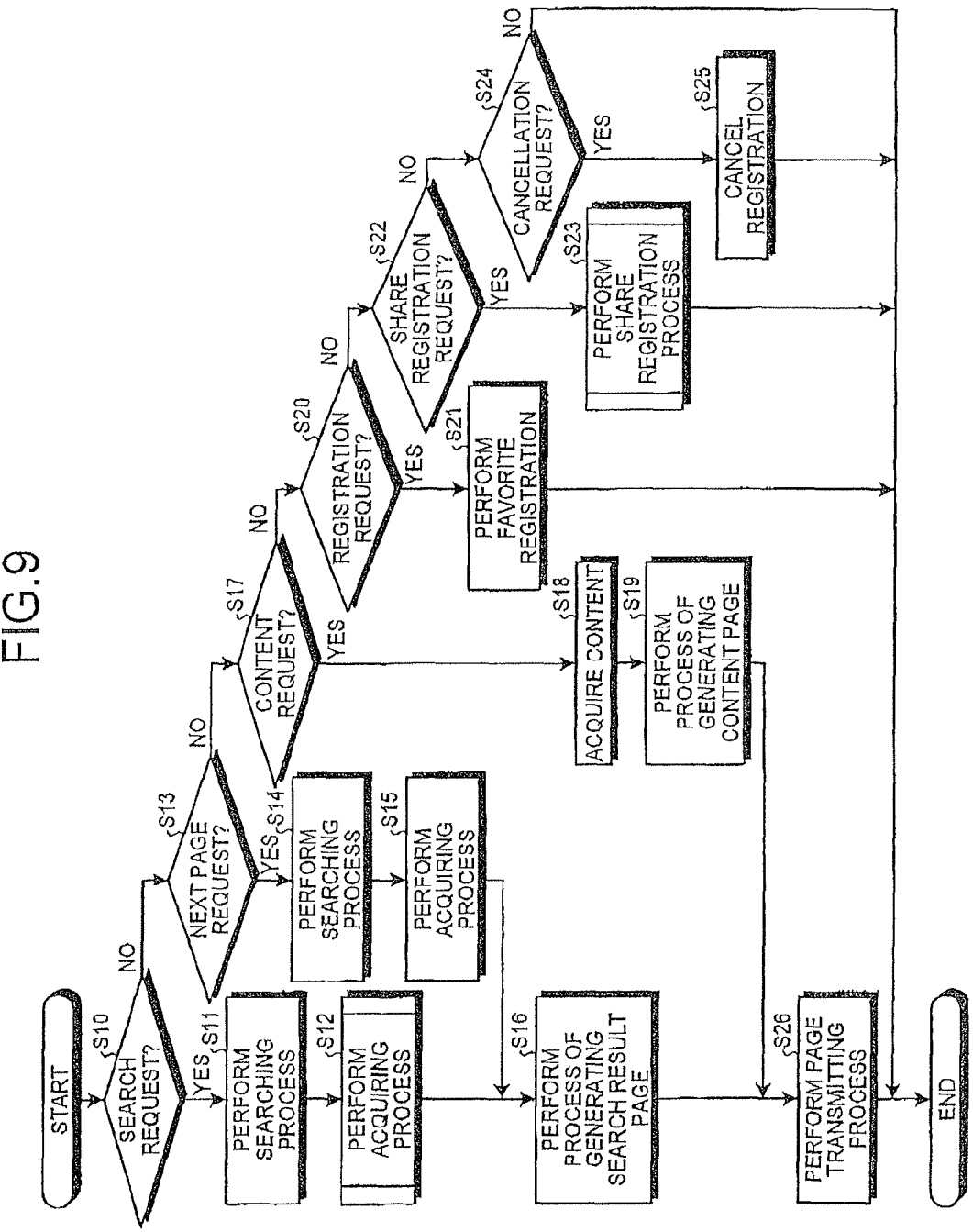
FIG. 9 is a flowchart illustrating a search information providing process performed by the search information providing apparatus according to the embodiment.

Next, the order of the search information providing process performed by the search information providing apparatus 1 according to the embodiment will be described. FIG. 9 is a flowchart illustrating the search information providing process performed by the search information providing apparatus 1 according to the embodiment. The search information providing process is a process that is repeatedly performed by the control unit 20.

As illustrated in FIG. 9, the receiving unit 21 of the control unit 20 determines whether to receive the search request including the search keyword from the user terminal 2 via the communication I/F 10 (step S10). When the receiving unit 21 determines to receive the search request (Yes in step S10), the searching unit 22 performs a searching process of acquiring the predetermined number of information which is relevant to the search keyword from the index DB 31 based on the search keyword included in the search request in order from the information which is the most relevant to the search keyword and receiving and transferring the information as the search result to the generating unit 24 (step S11).

For example, when the number of display frames 41 (see FIG. 7) of the search result disposed in the search result page is ten, the searching unit 22 acquires ten pieces of information in order from the information which is the most relevant to the search keyword from the index DB 31.

The index DB 31 is, for example, a database that is constructed by extracting the URL or keywords of web pages acquired by a crawling robot called a crawler. For example, the index DB 31 includes a "URL" field indicating a URL for accessing a web site accessed by the crawler and an "index keyword" field indicating a keyword extracted from the web site.

When the searching unit 22 ends the searching process, the acquiring unit 23 of the control unit 20 performs an acquiring process (step S12). The acquiring process is a process of acquiring the advertisement information corresponding to a designated search keyword from the advertisement DB 32, when the search keyword included in the search request is the designated search keyword. Further, the acquiring unit 23 also performs a process of acquiring the advertiser address corresponding to the designated search keyword in the acquiring process.

Here, the acquiring process performed by the acquiring unit 23 is performed after the searching process performed by the searching unit 22. However, the acquiring process performed by the acquiring unit 23 may be performed in parallel to the searching process performed by the searching unit 22. Thus, it is possible to improve the speed of the search information providing process.

When the receiving unit 21 determines not to receive the search request in step S10 (No in step S10), the receiving unit 21 determines whether to receive a transmission request (hereinafter, referred to as a next page request) for transmitting a next search result page from the user terminal 2 via the communication I/F 10 (step S13).

A "next search result page" is a page that is transmitted from the search information providing apparatus 1, when the number of search results in the searching process exceeds the number of display frames installed in the search result page. For example, the number of search results is 200 and the number of display frames is ten, the user can display nineteen "next search result pages" on the display unit of the user terminal 2 by repeatedly selecting the next page button.

When the receiving unit 21 determines to receive the transmission request for transmitting the next page request (Yes in step S13), the acquiring unit 23 performs the searching process (step S14). The next page request includes information regarding the number of completed searches, and therefore the predetermined number of new search results is searched based on the number of completed searches. For example, when forty search results which are highly relevant to the search keyword are provided to the user terminal 2, the number of completed searches is forty.

Next, the acquiring unit 23 performs an acquiring process (step S15). The acquiring process is the same as the process of step S12. The acquiring unit 23 can make the advertisement information different, whenever the next page button is selected in response to a request from the user terminal 2. Thus, the user of the user terminal 2 can view the search result page against a different background whenever the user selects the next page button.

When the process of step S12 or the process of step S15 ends, the generating unit 24 of the control unit 20 generates the search result page based on the search result obtained through the searching process and the acquisition result obtained through the acquiring process (step S16). The search result page is a page for displaying the search result of the searching unit 22, in which an image which is based on the advertisement information acquired by the acquiring unit 23 is set as a background image, and includes a link button configured such that the address of an advertiser page is a link destination.

When the search keyword is "soccer & socks" and the advertisement information table stored in the advertisement DB 32 is in the state illustrated in FIG. 3, for example, the search result page 40 illustrated in FIG. 7 is generated. The search result page 40 is generated with HTML. For example, the contents of the search result are described with text data and the display position of the advertisement information and the address are defined. The search result page 40 includes a link button 43. Therefore, the user of the user terminal 2 can select the link button 43 to access the advertiser page from the user terminal 2. The link button 43 has a color and a shape according to the corresponding advertisement image. Note that, the link button 43 may be a button in which one of the color and the shape corresponds to an advertisement image.

When the number of pieces of information corresponding to the search keyword searched by the searching unit 22 exceeds a predetermined number, the generating unit 24 generates a plurality of search result pages of which each displays the background image and the search results less than or equal to a predetermined number. These background images are different. That is, different advertisement images are set as background images between the first search result page and the next search result page, and different advertisement images are set as background images between the next search result pages. Accordingly, the user can display the search result pages in which the different advertisement images are set as the background images, whenever the user selects the next page button.

The generating unit 24 can set the different advertisement images as images for which at least one of a color and a size is different. The size can be set to be different, for example, by changing the width of the display frame of the advertisement image. Further, the color can be set such that the advertisement information table includes image information corresponding to images with different colors.

When the receiving unit 21 determines not to receive the transmission request for requesting the next page in step S13 (No in step S13), the receiving unit 21 determines whether to receive a content request from the user terminal 2 via the communication I/F 10 (step S17). When the receiving unit 21 determines to receive the content request (Yes in step S17), the generating unit 24 acquires information regarding a content corresponding to the content request from the content DB 34 (step S18).

Next, the generating unit 24 generates a content page including the information regarding the content acquired from the content DB 34 (step S19). Further, the generating unit 24 can restrict the information regarding the content included in the content page in accordance with the member classification of the user information table stored in the user information DB 33.

When the processes of steps S16 and S19 end, the transmitting unit 25 transmits the search result page or the content page generated by the generating unit 24 to the user terminal 2 of the request source via the communication I/F 10 (step S26). The user terminal 2 displays the image appropriate for the page received from the search information providing apparatus 1 on the browser screen.

When the receiving unit 21 determines not to receive the content request in step S17 (No in step S17), the receiving unit 21 determines whether to receive the registration request from the user terminal 2 via the communication I/F 10 (step S20). When the receiving unit 21 determines to receive the registration request (Yes in step S20), the receiving unit 21 updates the user information table stored in the user information DB 33 and performs the favorite registration (step S21). Specifically, the receiving unit 21 sets the latest advertisement ID as a registration advertisement ID in the information corresponding to a user ID (hereinafter, referred to as a request source user ID) of the user which is the request source and increments the number of registrations. For example, when the user information table is in the state illustrated in FIG. 6 and the user terminal 2 of the user corresponding to the user ID "20001" performs the registration request, the receiving unit 21 sets the registration advertisement ID to "10002" which is the same as the latest advertisement ID and sets the number of registrations to "2."

When the receiving unit 21 determines not to receive the registration request in step S20 (No in step S20), the receiving unit 21 determines whether to receive the share registration request from the user terminal 2 via the communication I/F 10 (step S22). When the receiving unit 21 determines to receive the share registration request (Yes in step S22), the receiving unit 21 updates the user information table stored in the user information DB 33 and performs the share registration (step S23).

When the receiving unit 21 determines not to receive the share registration in step S22 (No in step S22), the receiving unit 21 determines whether to receive the cancellation request from the user terminal 2 via the communication I/F 10 (step S24). When the receiving unit 21 determines to receive the cancellation request (Yes in step S24), the receiving unit 21 updates the user information table stored in the user information DB 33 and cancels registration (step S25). Specifically, the receiving unit 21 deletes the registration advertisement ID in the information corresponding to the request source user ID. The cancellation request is transmitted from the user terminal 2, for example, when the user selects the background cancellation button 55 illustrated in FIG. 7.

6. Operation (Acquiring Process)

Figure 10:
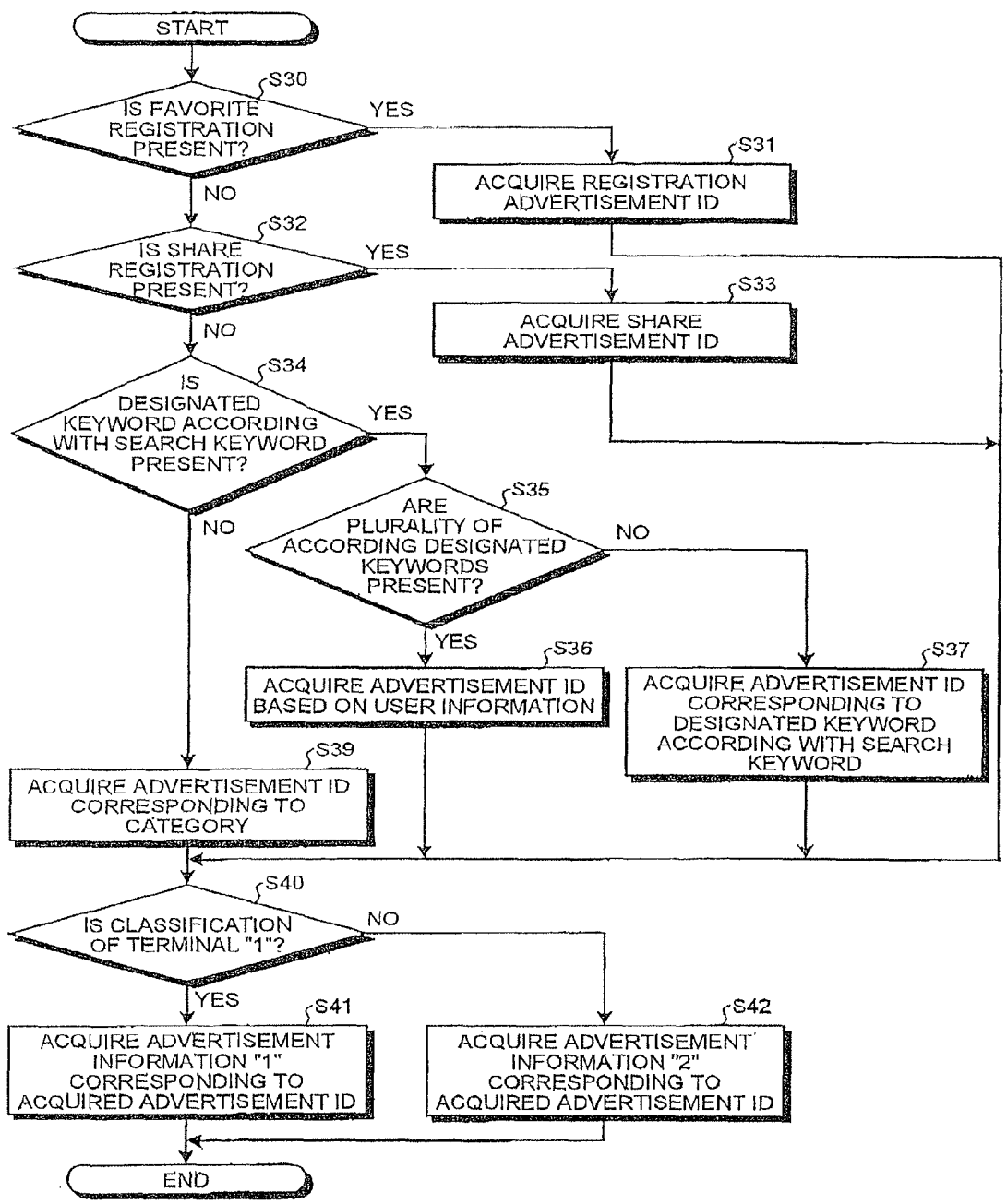
FIG. 10 is a flowchart illustrating an acquiring process in FIG. 9.

Next, an order of the acquiring process of step S12 illustrated in FIG. 9 will be described. FIG. 10 is a flowchart illustrating the acquiring process performed by the search information providing apparatus 1 according to the embodiment.

As illustrated in FIG. 10, the acquiring unit 23 of the control unit 20 determines whether the favorite registration corresponding to the request source user ID is present based on the user information table stored in the user information DB 33 (step S30). When the registration advertisement ID corresponding to the request source user ID is present, the acquiring unit 23 determines that the favorite registration corresponding to the request source user ID is present. Otherwise, the acquiring unit 23 determines that the favorite registration corresponding to the request source user ID is not present.

When the acquiring unit 23 determines that the favorite registration corresponding to the request source user ID is present (Yes in step S30), the acquiring unit 23 acquires the registration advertisement ID in the user information table (step S31). Thus, the generating unit 24 generates the search result page in which the advertisement image corresponding to the registration advertisement ID is set as the background image, and the transmitting unit 25 transmits the generated search result page to the user terminal 2.

When the acquiring unit 23 determines that the favorite registration corresponding to the request source user ID is not present in step S30 (No in step S30), the acquiring unit 23 determines whether the share registration corresponding to the request source user ID is present based on the user information table stored in the user information DB 33 (step S32). When the share advertisement ID corresponding to the request source user ID is present, the acquiring unit 23 determines that the share registration corresponding to the request source user ID is present. Otherwise, the acquiring unit 23 determines that the share registration corresponding to the request source user ID is not present.

When the acquiring unit 23 determines that the share registration is present (Yes in step S32), the acquiring unit 23 acquires the share advertisement ID from the user information table (step S33). Thus, the generating unit 24 generates the search result page in which the advertisement image corresponding to the share advertisement ID is set as the background image, and the transmitting unit 25 transmits the generated search result page to the user terminal 2.

When the acquiring unit 23 determines that the share registration is not present in step S32 (No in step S32), the acquiring unit 23 determines whether the designated keyword that accords with the search keyword is present based on the user information table stored in the user information DB 33 (step S34).

When the acquiring unit 23 determines whether the designated keyword that accords with the search keyword is present (Yes in step S34), the acquiring unit 23 determines whether the plurality of advertisement IDs (hereinafter, accord advertisement ID) that accord with the search keyword are present (step S35). When the acquiring unit 23 determines that the plurality of accord advertisement IDs are present (Yes in step S35), the acquiring unit 23 extracts one accord advertisement ID among the accord advertisement IDs based on the user information table stored in the user information DB 33 (step S36).

Specifically, the acquiring unit 23 acquires user attributes such as the sex, age, and the preference information of the user corresponding to the request source user ID from the user information table and acquires the accord advertisement ID which is the most relevant to the user attributes. Note that, the accord advertisement ID which is the most relevant to the attribute information is, for example, an accord advertisement ID for which relevance between the field or contents of the advertiser page and the user attributes is the highest. The field or contents of the advertiser page can be determined through a document analyzing process by the control unit 20.

When the acquiring unit 23 can acquire the position information of the user terminal 2 via the receiving unit 21, the acquiring unit 23 may acquire the accord advertisement ID which is the most relevant to the position information of the user terminal 2. For example, the acquiring unit 23 acquires the accord advertisement ID that accords with or is the most relevant to an advertisement image present near the position of the user terminal 2. Further, for example, the acquiring unit 23 may acquire the accord advertisement ID which is the most relevant with the position of the user terminal 2.

When the acquiring unit 23 determines whether the plurality of accord advertisement ID are not present in step S35 (No in step S35), the acquiring unit 23 acquires the accord advertisement ID as an extracting advertisement ID (step S37).

When the acquiring unit 23 determines that the designated keyword that accords with the search keyword is not present in step S34 (No in step S34), the acquiring unit 23 determines a category corresponding to the search keyword and acquires one advertisement ID corresponding to a category which accords with the category from the advertisement information table (step S39). For example, when the search keyword is "soccer wear," the acquiring unit 23 determines the corresponding category is "cloth." When the advertisement information table is in the state illustrated in FIG. 3, the advertisement ID acquired by the acquiring unit 23 is "10001."

When the advertisement ID corresponding to category that accords with the category corresponding to the search keyword is not present, the acquiring unit 23 acquires the advertisement ID which is random or is based on a predetermined rule from the advertisement information table. Further, instead of acquiring the advertisement ID that accords with the category, the acquiring unit 23 may acquire the advertisement ID which is random or is based on a predetermined rule from the advertisement information table. Furthermore, the acquiring unit 23 may acquire one advertisement ID based on the user information table from the advertisement information table, as in step S36.

Next, in step S40, the acquiring unit 23 determines whether the advertisement classification corresponding to the user performing the search request is "1" (step S40). Since the classification of the user terminal 2 is included in the search request, the acquiring unit 23 acquires classification information of the user terminal 2 from the receiving unit 21. When the acquiring unit 23 determines that the advertisement classification corresponding to the user is "1" (Yes in step S40), the acquiring unit 23 acquires the advertisement information regarding the advertisement classification "1" corresponding to the acquired advertisement ID from the advertisement information table (step S41). The acquired advertisement ID is an advertisement ID acquired in any one of steps S31, S33, S36, S37, and S39.

Conversely, when the acquiring unit 23 determines that the advertisement classification corresponding to the user is not "1" in step S40 (No in step S40), the acquiring unit 23 acquires the advertisement information regarding the advertisement classification "2" corresponding to the acquired advertisement ID from the advertisement information table (step S42). Note that, when the advertisement classification corresponding to the classification of the user terminal 2 is not present in the advertisement information table, the acquiring unit 23 acquires the advertisement information corresponding to the advertisement classification present in the advertisement information table.

Thus, the acquiring unit 23 acquires the advertisement IDs preferentially in the order of the registration advertisement ID, the share advertisement ID, and the accord advertisement ID and acquires the advertisement information corresponding to the classification of the user terminal 2. Note that, the acquiring unit 23 may set the acquisition preference order to the order of the share advertisement ID, the registration advertisement ID, and the accord advertisement ID.

7. Operation (Share Registering Process)

Figure 11:
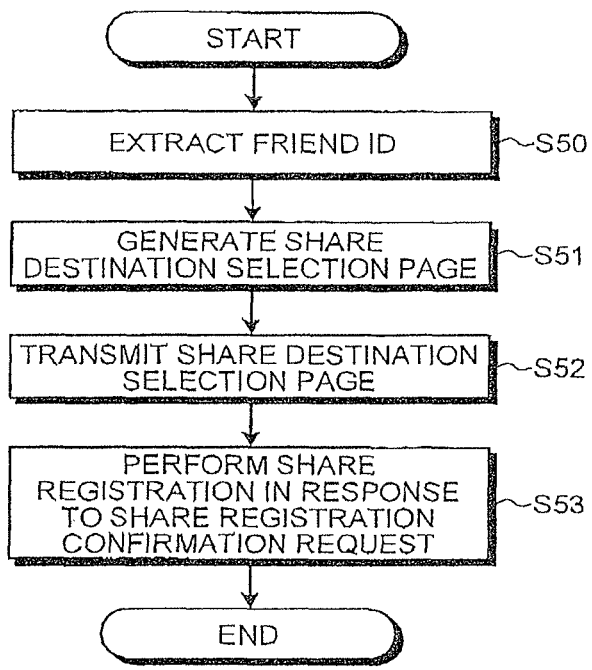
FIG. 11 is a flowchart illustrating a share registering process in FIG. 9.

Next, an order of the share registering process of step S23 illustrated in FIG. 9 will be described. FIG. 11 is a flowchart illustrating the share registering process performed by the search information providing apparatus 1 according to the embodiment.

As illustrated in FIG. 11, the acquiring unit 23 of the control unit 20 acquires the friend ID corresponding to the user ID based on the request source user ID of the share registration request from the user information DB 33 (step S50). Since the user information DB 33 stores a friend information table (not illustrated) in which the friend ID is associated with each user ID, the acquiring unit 23 acquires the friend ID corresponding to the request source user ID from the friend information table. Further, the acquiring unit 23 increments the number of shares corresponding to the request source user ID of the share registration request.

Note that, the friend information table is, for example, a friend information table used for an SNS (Social Networking Service) service provided by the search information providing apparatus 1 or a friend information table used for an SNS service provided by an external server. In the case of the friend information table used for the SNS service provided by the external server, a separate user ID correspondence table is stored in the user information DB 33 and different user IDs are converted between services using the user ID correspondence table.

Next, the generating unit 24 acquires the friend name corresponding to the friend ID acquired by the acquiring unit 23 from the user information DB 33 and generates the share destination selection page in which the friend name is listed as the share candidate (step S51). Since the user information DB 33 stores a user registration table in which information regarding user names, log-in IDs, passwords, and the like is associated with each other in correspondence with the user IDs, the generating unit 24 acquires the friend name corresponding to the friend ID from the user registration table.

Next, the transmitting unit 25 transmits the share destination selection page generated by the generating unit 24 to the user terminal 2 of the request source (step S52). Thereafter, when the share registration confirmation request is received from the user terminal 2, the share advertisement ID corresponding to the selected friend ID is set (step S53). Specifically, the receiving unit 21 acquires the latest advertisement ID corresponding to the request source user ID (principal ID) from the user information table and updates the user information table such that the latest advertisement ID is set as the share advertisement ID corresponding to the friend ID.

8. Operation (Compensation and Privilege Deciding Process)

Figure 12:
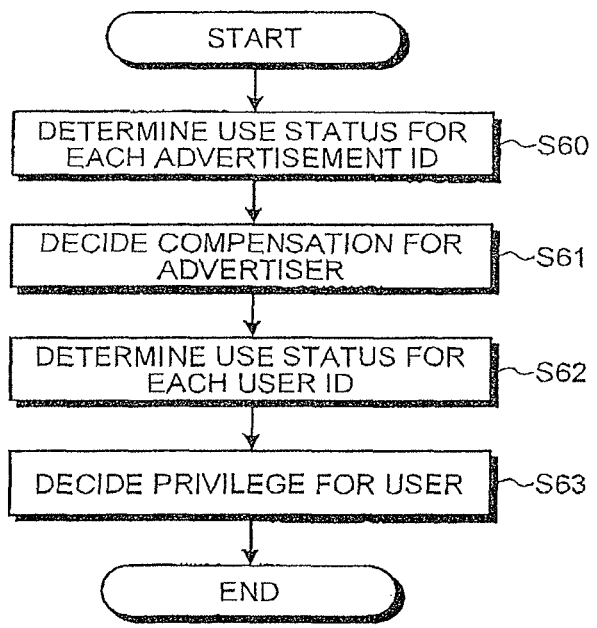
FIG. 12 is a flowchart illustrating a compensation and privilege deciding process performed by the search information providing apparatus according to the embodiment.

Next, an order of the compensation and privilege deciding process performed by the search information providing apparatus 1 will be described. FIG. 12 is a flowchart illustrating compensation and privilege deciding process performed by the search information providing apparatus 1 according to the embodiment. The compensation and privilege deciding process is a process that is performed repeatedly at a predetermined period by the control unit 20.

As illustrated in FIG. 12, the determining unit 26 of the control unit 20 acquires information from the advertisement information table stored in the advertisement DB 32 and determines a use status of each advertisement ID (step S60). For example, the determining unit 26 acquires the number of searches, the number of displays, the number of registrations, and the number of shares for each advertisement ID from the advertisement information table and calculates a use point for each advertisement ID.

For example, a use point at each search time, a use point at each display time of an advertisement image, a use point at each favorite registration time, and a use point at each share registration are set and stored in the advertisement DB 32. The determining unit 26 calculates the use point for each advertisement ID based on the set use points. Note that, the determining unit 26 may determine the use status of each advertisement ID based on not all of the number of searches, the number of displays, the number of registrations, and the number of shares but some thereof.

The deciding unit 27 determines the compensation for the advertisement posting right for the advertisement ID based on the use status determined by the determining unit 26 (step S61). Further, the advertisement ID for which the processes of steps S60 and S61 are performed is an advertisement ID corresponding to the success reward type background editing right. Accordingly, the processes of steps S60 and S61 are not performed for the advertisement ID in which the display upper limit number is defined.

Next, the determining unit 26 of the control unit 20 acquires information from the user information table stored in the user information DB 33 and determines the search service use status of each user ID (step S62). For example, the determining unit 26 acquires the number of searches, the number of displays, the number of registrations, and the number of shares for each user ID from the user information table and calculates a use point for each user ID. A method of calculating the use point may be, for example, the same as the method in the process of step S60.

The deciding unit 27 decides the privilege for the user ID based on the service use status of each user ID determined by the determining unit 26 (step S63). For example, the deciding unit 27 may set the member classification from "1" to "2" or decrease the cost of a content which may be used by the user terminal 2. Further, the determining unit 26 may decrease a membership fee, when the member classification of the user is "2." Thus, the determining unit 26 may determine the compensation for the provided content. Furthermore, the determining unit 26 may provide a coupon, a present, or the like to the user.

Thus, the search information providing apparatus 1 may determine the price of the compensation in accordance with the use status of each advertisement and also may provide a privilege for each user in accordance with the use status of each user. Since the privilege provided to each user may motivate each user to use the search service, it is possible to increase a chance to suggest the advertisement image to the user of the user terminal 2. Furthermore, by increasing the use point of the favorite registration or the share registration than that at the searching or displaying time, the user may be motivated to perform the favorite registration or the share registration. Thus, since the same advertisement image may be displayed to the user, the advertisement effect may be further improved.

Further, the control unit 20 may perform the processes of steps S60 and 61 at a period different from the period of the processes of steps S62 and S63.

9. Advantages

In the search information providing apparatus 1 described above according to the embodiment, the receiving unit 21 receives a search request including a search keyword from the user terminal 2. The searching unit 22 acquires information corresponding to the search keyword as a search result based on the search keyword included in the search request. The advertisement DB 32 (corresponding to an example of an advertisement information storage unit) stores advertisement information corresponding to a designated keyword (corresponding to an example of a specific search keyword). The acquiring unit 23 acquires the advertisement information corresponding to the designated keyword from the advertisement DB 32, when the search keyword included in the search request is the designated keyword stored in the advertisement DB 32. The generating unit 24 generates a search result page for displaying the search result and a background image based on the advertisement information acquired by the acquiring unit 23. The transmitting unit 25 transmits the search result page generated by the generating unit 24 to the user terminal 2 performing the search request that accords with the designated keyword.

Thus, the search information providing apparatus 1 according to the embodiment can display the image which is based on the advertisement information in the background image of the search result page in response to the search keyword, and therefore can effectively display advertisement. For example, a search service provider can provide a new advertisement method to advertisers, thereby increasing an advertisement income. Further, the advertisers can deliver the high favorite advertisement with impact, thereby improving an advertisement effect. Since a screen of a simple search result is not displayed but desired information is displayed with the background display relevant to interest information to the users, the users can feel novelty and pleasure of a search service. Further, the effective advertisement display can be realized even with a portable device in which a display range is restricted.

Further, in the search information providing apparatus 1 according to the embodiment, the user information DB 33 (corresponding to an example of a user information storage unit) stores information regarding the user of the user terminal 2. The acquiring unit 23 selects advertisement information corresponding to the information stored in the user information DB 33 among the advertisement information corresponding to the designated keyword, when the search keyword included in the search request is the designated keyword stored in the advertisement DB 32.

Thus, since the search information providing apparatus 1 according to the embodiment can select not only the search keyword but also the advertisement information corresponding to the user information, advertisement can be displayed more effectively to the user.

Further, in the search information providing apparatus 1 according to the embodiment, the receiving unit 21 determines a classification of the user terminal 2 performing the search request. The advertisement DB 32 stores advertisement information corresponding to the classification of the user terminal 2 as the advertisement information corresponding to the designated keyword. The acquiring unit 23 selects the advertisement information corresponding to the classification of the user terminal 2 performing the search request as the advertisement information corresponding to the designated keyword, when the search keyword included in the search request is the designated keyword stored in the advertisement DB 32.

Thus, since the search information providing apparatus 1 according to the embodiment can set the image which is based on the advertisement information corresponding to the classification of the user terminal 2 as the background image of the search result page, for example, the background image corresponding to the screen size can be selected. Therefore, the suitable advertisement display can be performed in accordance with the classification of the user terminal 2, thereby realizing the advertisement effect more effectively.

In the search information providing apparatus 1 according to the embodiment, the receiving unit 21 receives a registration request for requesting the background image displayed in the search result page from the user terminal 2. The acquiring unit 23 acquires advertisement information corresponding to the background image of the registration request from the advertisement DB 32 instead of the advertisement information corresponding to the designated keyword included in the search request, when the user terminal 2 performing the registration request performs the search request including the designated keyword stored in the advertisement DB 32.

Thus, the search information providing apparatus 1 according to the embodiment can continue displaying the advertisement display favored by the user in the search result page. Therefore, the user can use the search service through the preferred background display, while the advertiser can continue displaying the same advertisement to the user. Therefore, the advertisement effect can be realized more effectively.

In the search information providing apparatus 1 according to the embodiment, the advertisement DB 32 stores an address of an advertiser page (corresponding to an example of a predetermined page) in correspondence with the advertisement information. The generating unit 24 adds a link button for accessing the advertiser page corresponding to the advertisement information acquired by the acquiring unit 23 to the search result page based on the address of the advertiser page stored in the advertisement DB 32.

Thus, since the search information providing apparatus 1 according to the embodiment can urge the user to access the advertiser page, guide to conversion in addition to impression can be realized.

In the search information providing apparatus 1 according to the embodiment, the link button has a color and/or a shape according to an image based on the corresponding advertisement information.

Thus, the search information providing apparatus 1 according to the embodiment can realize a synergistic advertisement effect of the background image and the link button. Further, since the link button can be effectively displayed, an access possibility to the advertiser page can be increased.

In the search information providing apparatus 1 according to the embodiment, the content DB 34 stores a content to be provided to each user terminal 2. The deciding unit 27 decides a compensation for the provision of the content for each user terminal 2. The determining unit 26 determines a use status of the advertisement information corresponding to the designated keyword for each user terminal 2. The deciding unit 27 decides the compensation for the provision of the content based on the determination result of the determining unit 26.

Thus, the search information providing apparatus 1 according to the embodiment can provide an incentive to use the search service. Therefore, the number of uses of the search service can be increased, and thus the advertisement effect can be further improved.

In the search information providing apparatus 1 according to the embodiment, when information corresponding to the search keyword searched by the searching unit 22 exceeds a predetermined number, a plurality of search result pages of which each displays the background image and the search results less than or equal to a predetermined number, the background images being different.

Thus, the search information providing apparatus 1 according to the embodiment can display the different background displays between the search result pages. Therefore, the users can further feel novelty and pleasure of the search service.

In the search information providing apparatus 1 according to the embodiment, images for which at least one of a color and a size is different are set as the different background images.

Thus, the search information providing apparatus 1 according to the embodiment can perform the background' display such that the color or size is different. Therefore, the users can further feel novelty and pleasure of the search service due to the color or change of the same advertisement image.

10. Others

In the above-described embodiment, the example has been described in which the advertisement information based on the user information is selected through the user registration. However, for example, the user information may be collected using an HTTP cookie (HyperText Transfer Protocol Cookie) and the advertisement information may be selected based on the user information.

In the above-described embodiment, the example of the search result page in which a banner advertisement or the like is not displayed has been described. The designated keyword and a banner advertisement or an advertisement text may be associated in the advertisement information table and the advertisement banner or the advertisement text may be displayed in addition to the background image in the search result page. In this case, for example, the control unit 20 can cause the advertisement banner of the same advertiser not to overlap with the background image which is based on the advertisement information. Further, the control unit 20 may preferentially display the advertisement banner of the advertiser performing the favorite registration on the user terminal 2 performing the favorite registration on the advertisement information. Thus, the number of clicks of the advertisement banner can be expected to be increased.

In the above-described embodiment, the share registration has been described. However, the control unit 20 can limit the number of times information is displayed on the user terminal 2 of a friend, when the share registration is performed. For example, the share registration is deleted after the search request is performed by a predetermined number of times from the user terminal 2 of a friend after the share registration. In this case, the friend can display the search result page in which the advertisement image continuously shared and registered is set as the background image by performing the favorite registration until the number of search request exceeds the predetermined number of times. On the other hand, when the friend does not like the shared and registered advertisement image, the friend can display an advertisement image corresponding to the search keyword by performing nothing or selecting the background cancellation button.

In the above-described embodiment, the control unit 20 increments the number of displays of the advertisement information table for each search result page. However, for example, the control unit 20 may update the number of displays of the advertisement information table in accordance with the number of display frames. In this case, for example, the control unit 20 can acquire scroll information from the user terminal 2 and determine the number of display frames actually displayed on the display unit of the user terminal 2.

In the above-described embodiment, the advertisement image corresponding to the same advertisement ID is configured to be displayed in one search result page. However, the control unit 20 may display an advertisement image with different advertisement ID in each display frame of a predetermined number unit.

In the above-described embodiment, the example has been described in which the background registration button, the background share button, and the background cancellation button are disposed in the search toolbar, but the buttons for the advertisement image are not limited to these buttons. For example, a background change button may be disposed in the search toolbar. When the user selects the background change button, a background change request may be transmitted from the user terminal 2 to the search information providing apparatus 1. In this case, the control unit 20 generates a search result page in which the advertisement image is changed and transmits the generated search result page to the user terminal 2 of the request source.

The above-described search information providing apparatus 1 may be realized by a plurality of server computers, and depending on the function the configuration may be changed flexibly, for example, by calling and realizing an external platform or the like by an API (Application Programming Interface), a network computing, or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A search information providing apparatus comprising:
    a receiving unit, implemented on a processor operatively coupled to a memory, which receives a search request including a search keyword from a user terminal;
    a searching unit, implemented on the processor operatively coupled to the memory, which acquires first information corresponding to the search keyword as a search result based on the search keyword included in the search request;
    an information memory that stores second information corresponding to a specific search keyword;
    an acquiring unit, implemented on the processor operatively coupled to the memory, which acquires the second information corresponding to the specific search keyword from the information memory when the search keyword included in the search request is the specific search keyword;
    a generating unit, implemented on the processor operatively coupled to the memory, which generates a search result page for displaying the search result and a background image based on the second information acquired by the acquiring unit; and
    a transmitting unit, implemented on the processor operatively coupled to the memory, which transmits the search result page generated by the generating unit to the user terminal performing the search request including the specific search keyword, wherein
    the receiving unit receives, from the user terminal, a registration request for registration of the background image that is displayed in the search result page and in response to receiving the registration request, information associated with the background image is stored, and
    the receiving unit further receives, a cancellation request for cancellation of the background image registered by the user, and deletes the information associated with the background image that was stored to cancel the registration of the background image.

2. The search information providing apparatus according to claim 1, further comprising:
    a user information memory, implemented on the processor operatively coupled to the memory, that stores information regarding a user of the user terminal,
    wherein the acquiring unit selects second information corresponding to the information stored in the user information memory among the second information corresponding to the specific search keyword when the search keyword included in the search request is the specific search keyword.

3. The search information providing apparatus according to claim 1,
    wherein the receiving unit determines a classification of the user terminal performing the search request,
    wherein the information memory stores second information corresponding to the classification of the user terminal as the second information corresponding to the specific search keyword, and
    wherein the acquiring unit selects the second information corresponding to the classification of the user terminal performing the search request as the second information corresponding to the specific search keyword when the search keyword included in the search request is the specific search keyword.

4. The search information providing apparatus according to claim 1,
    wherein the acquiring unit acquires second information corresponding to the background image of the registration request instead of the second information corresponding to the specific search keyword included in the search request when the user terminal performing the registration request performs the search request including the specific search keyword.

5. The search information providing apparatus according to claim 1,
    wherein the information memory stores an address of a predetermined page in correspondence with the second information, and
    wherein the generating unit adds, to the search result page, a button for accessing the predetermined page corresponding to the second information acquired by the acquiring unit based on the address of the predetermined page stored in the information memory.

6. The search information providing apparatus according to claim 5, wherein the button has a color and/or a shape according to an image based on the corresponding second information.

7. The search information providing apparatus according to claim 1, further comprising:
    a content memory, implemented on the processor operatively coupled to the memory, that stores a content to be provided to each user terminal;
    a deciding unit, implemented on the processor operatively coupled to the memory, that decides a compensation for the provision of the content for each user terminal; and
    a determining unit, implemented on the processor operatively coupled to the memory, that determines a use status of the second information corresponding to the specific search keyword for each user terminal,
    wherein the generating unit transmits a content page including the content stored in the content memory to the user terminal, and
    wherein the deciding unit decides the compensation for the provision of the content based on the determination result of the determining unit.

8. The search information providing apparatus according to claim 1, wherein when information corresponding to the search keyword searched by the searching unit exceeds a predetermined number, the generating unit generates a plurality of search result pages of which each displays the background image and the search results less than or equal to a predetermined number, the background images being different.

9. The search information providing apparatus according to claim 8, wherein the generating unit sets images of which at least one of a color and a size is different as the different background images.

10. A search information providing method comprising:
    (A) receiving, by a computer, a search request including a search keyword from a user terminal;

(B) acquiring, by the computer, first information corresponding to the search keyword as a search result based on the search keyword included in the search request;

(C) acquiring, by the computer, second information corresponding to a specific search keyword from an information memory that stores the second information corresponding to the specific search keyword when the search keyword included in the search request is the specific search keyword;

(D) generating, by the computer, a search result page for displaying the search result and a background image based on the second information acquired in the (C) acquiring; and (E) transmitting, by the computer, the search result page generated in the (D) generating to the user terminal performing the search request including the specific search keyword, wherein the receiving includes receiving, from the user terminal, a registration request for registration of the background image that is displayed in the search result page and in response to receiving the registration request, information associated with the background image is stored, and the receiving includes receiving a cancellation request for cancellation of the background image registered by the user, and deletes the information associated with the background image that was stored to cancel the registration of the background image.

11. A search information providing apparatus comprising:

a receiving unit, implemented on a processor operatively coupled to a memory, which receives a search request including a search keyword from a user terminal;

a searching unit, implemented on the processor operatively coupled to the memory, which acquires first information corresponding to the search keyword as a search result based on the search keyword included in the search request;

an information memory that stores second information corresponding to a specific search keyword;

an acquiring unit, implemented on the processor operatively coupled to the memory, which acquires the second information corresponding to the specific search keyword from the information memory when the search keyword included in the search request is the specific search keyword;

a generating unit, implemented on the processor operatively coupled to the memory, which generates a search result page for displaying the search result and a background image based on the second information acquired by the acquiring unit; and a transmitting unit, implemented on the processor operatively coupled to the memory, which transmits the search result page generated by the generating unit to the user terminal performing the search request including the specific search keyword, wherein the receiving unit receives, from the user terminal, a share registration request for registration of the background image of the search result page that is displayed on a terminal of another user and in response to receiving the share registration request, information associated with the background image is stored, and wherein the receiving unit further receives a cancellation request for cancellation of the background image registered by the user, and deletes the information associated with the background image that was stored to cancel the registration of the background image.

* * * * *